United States Patent
Kasonde et al.

(10) Patent No.: US 10,329,848 B2
(45) Date of Patent: Jun. 25, 2019

(54) SUPERHARD CONSTRUCTIONS AND METHODS OF MAKING SAME

(71) Applicant: Element Six (UK) Limited, Oxfordshire (GB)

(72) Inventors: Maweja Kasonde, Oxfordshire (GB); Mehmet Serdar Ozbayraktar, Oxfordshire (GB); Valentine Kanyanta, Oxfordshire (GB); Teresa Rodriguez Suarez, Oxfordshire (GB)

(73) Assignee: ELEMENT SIX (UK) LIMITED, Didcot (GB)

( * ) Notice: Subject to any disclaimer, the term of this patent is extended or adjusted under 35 U.S.C. 154(b) by 3 days.

(21) Appl. No.: 15/322,603

(22) PCT Filed: Jul. 1, 2015

(86) PCT No.: PCT/EP2015/001319
§ 371 (c)(1),
(2) Date: Dec. 28, 2016

(87) PCT Pub. No.: WO2016/000820
PCT Pub. Date: Jan. 7, 2016

(65) Prior Publication Data
US 2017/0314335 A1    Nov. 2, 2017

(30) Foreign Application Priority Data
Jul. 1, 2014    (GB) .................................. 1411676.8

(51) Int. Cl.
*B24D 18/00*    (2006.01)
*E21B 10/573*    (2006.01)
(Continued)

(52) U.S. Cl.
CPC ...... *E21B 10/5735* (2013.01); *B24D 18/0009* (2013.01); *B28B 1/001* (2013.01);
(Continued)

(58) Field of Classification Search
CPC . E21B 10/5735; B33Y 10/00; B24D 18/0009; B28B 1/001; B28B 1/24; B28B 11/12
See application file for complete search history.

(56) References Cited

U.S. PATENT DOCUMENTS 4,627,503 A * 12/1986 Horton .................... B23B 51/00
                                                 175/420.2
5,123,217 A    6/1992 Ishikawa et al.
(Continued)

FOREIGN PATENT DOCUMENTS

CN        203394353 A    1/2014
EP        0716215 A2    6/1996
(Continued)

OTHER PUBLICATIONS

Search Report for GB1411676.8 dated Dec. 8, 2014.
Search Report for GB1511567.8 dated Oct. 30, 2015.
Search Report for PCT/EP2015/001319 dated May 6, 2016.

*Primary Examiner* — Pegah Parvini
(74) *Attorney, Agent, or Firm* — Bryan Cave Leighton Paisner LLP (57) ABSTRACT

A super hard polycrystalline construction comprises a body of polycrystalline super hard material, said body having an exposed working surface, a substrate attached to the body of polycrystalline super hard material along an interface and a plurality of apertures or channels. One or more of said apertures or channels extend(s) from the exposed working surface of the body into the substrate.

17 Claims, 4 Drawing Sheets

(51) Int. Cl.
    *B28B 1/00*         (2006.01)
    *B28B 1/24*         (2006.01)
    *B28B 11/12*       (2006.01)
    *B33Y 10/00*       (2015.01)

(52) U.S. Cl.
    CPC ............... *B28B 1/24* (2013.01); *B28B 11/12* (2013.01); *B33Y 10/00* (2014.12); *E21B 10/573* (2013.01)

(56) References Cited

U.S. PATENT DOCUMENTS

| | | | |
|---|---|---|---|
| 5,662,720 A * | 9/1997 | O'Tighearnaigh | B22F 7/06 51/295 |
| 5,928,071 A * | 7/1999 | Devlin | B23B 27/146 175/428 |
| 8,336,648 B1 | 12/2012 | Weaver et al. | |
| 2006/0060392 A1 | 3/2006 | Eyre | |
| 2006/0157285 A1 | 7/2006 | Cannon et al. | |
| 2010/0012389 A1 | 1/2010 | Zhang et al. | |
| 2010/0294571 A1 | 11/2010 | Belnap et al. | |
| 2014/0110180 A1 | 4/2014 | Yu | |

FOREIGN PATENT DOCUMENTS

| | | |
|---|---|---|
| EP | 0919336 A2 | 6/1999 |
| GB | 2364082 A | 1/2002 |
| JP | S61209821 A | 9/1986 |
| WO | 2006032982 A1 | 3/2006 |
| WO | 2008096314 A3 | 8/2008 |
| WO | 2009128034 A1 | 10/2009 |
| WO | 2011141898 A1 | 11/2011 |
| WO | 2014086721 A1 | 6/2014 |

\* cited by examiner

SUPERHARD CONSTRUCTIONS AND METHODS OF MAKING SAME

FIELD

This disclosure relates to superhard constructions and methods of making such constructions, particularly but not exclusively to constructions comprising polycrystalline diamond (PCD) structures attached to a substrate, and tools comprising the same, particularly but not exclusively for use in rock degradation or drilling, or for boring into the earth.

BACKGROUND

Polycrystalline superhard materials, such as polycrystalline diamond (PCD) may be used in a wide variety of tools for cutting, machining, drilling or degrading hard or abrasive materials such as rock, metal, ceramics, composites and wood-containing materials. In particular, tool inserts in the form of cutting elements comprising PCD material are widely used in drill bits for boring into the earth to extract oil or gas. The working life of super hard tool inserts may be limited by fracture of the super hard material, including by spalling and chipping, or by wear of the tool insert.

Cutting elements such as those for use in rock drill bits or other cutting tools typically have a body in the form of a substrate which has an interface end/surface and a super hard material which forms a cutting layer bonded to the interface surface of the substrate by, for example, a sintering process. The substrate is generally formed of a tungsten carbide-cobalt alloy, sometimes referred to as cemented tungsten carbide and the super hard material layer is typically polycrystalline diamond (PCD), or a thermally stable product TSP material such as thermally stable polycrystalline diamond.

Polycrystalline diamond (PCD) is an example of a superhard material (also called a superabrasive material or ultra hard material) comprising a mass of substantially intergrown diamond grains, forming a skeletal mass defining interstices between the diamond grains. PCD material typically comprises at least about 80 volume % of diamond and is conventionally made by subjecting an aggregated mass of diamond grains to an ultra-high pressure of greater than about 5 GPa, and temperature of at least about 1,200° C., for example. A material wholly or partly filling the interstices may be referred to as filler or binder material.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Most typically, PCD is often formed on a cobalt-cemented tungsten carbide substrate, which provides a source of cobalt solvent-catalyst for the PCD. Materials that do not promote substantial coherent intergrowth between the diamond grains may themselves form strong bonds with diamond grains, but are not suitable solvent—catalysts for PCD sintering.

Cemented tungsten carbide which may be used to form a suitable substrate is formed from carbide particles being dispersed in a cobalt matrix by mixing tungsten carbide particles/grains and cobalt together then heating to solidify. To form the cutting element with a superhard material layer such as PCD, diamond particles or grains are placed adjacent the cemented tungsten carbide body in a refractory metal enclosure such as a niobium enclosure and are subjected to high pressure and high temperature so that inter-grain bonding between the diamond grains occurs, forming a polycrystalline superhard diamond layer.

In some instances, the substrate may be fully cured prior to attachment to the superhard material layer whereas in other cases, the substrate may be green, that is, not fully cured. In the latter case, the substrate may fully cure during the HTHP sintering process. The substrate may be in powder form and may solidify during the sintering process used to sinter the superhard material layer.

Ever increasing drives for improved productivity in the earth boring field place ever increasing demands on the materials used for cutting rock. Specifically, PCD materials with improved abrasion and impact resistance are required to achieve faster cut rates and longer tool life.

Cutting elements or tool inserts comprising PCD material are widely used in drill bits for boring into the earth in the oil and gas drilling industry. Rock drilling and other operations require high abrasion resistance and impact resistance. One of the factors limiting the success of the polycrystalline diamond (PCD) abrasive cutters is the generation of heat due to friction between the PCD and the work material. This heat causes the thermal degradation of the diamond layer. The thermal degradation increases the wear rate of the cutter through increased cracking and spalling of the PCD layer as well as back conversion of the diamond to graphite causing increased abrasive wear.

Methods used to improve the abrasion resistance of a PCD composite often result in a decrease in impact resistance of the composite.

The most wear resistant grades of PCD usually suffer from a catastrophic fracture of the cutter before it has worn out. During the use of these cutters, cracks grow until they reach a critical length at which catastrophic failure occurs, namely, when a large portion of the PCD breaks away in a brittle manner. These long, fast growing cracks encountered during use of conventionally sintered PCD, result in short tool life. Furthermore, despite their high strength, polycrystalline diamond (PCD) materials are usually susceptible to impact fracture due to their low fracture toughness. Improving fracture toughness without adversely affecting the material's high strength and abrasion resistance is a challenging task.

There is therefore a need for a PCD composite that has good or improved abrasion, fracture and impact resistance and a method of forming such composites.

SUMMARY

Viewed from a first aspect there is provided a super hard polycrystalline construction comprising:
  a body of polycrystalline super hard material, said body having an exposed working surface;
  a substrate attached to the body of polycrystalline super hard material along an interface; and
  a plurality of apertures or channels, one or more of said apertures or channels extending from the exposed working surface of the body into the substrate.

Viewed from a second aspect there is provided a method of forming a superhard polycrystalline construction, comprising:

providing a mass of particles or grains of superhard material and a mass of particles or grains of hard material to form a pre-sinter assembly;

treating the pre-sinter assembly in the presence of a catalyst/solvent material for the superhard grains at an ultra-high pressure of around 5 GPa or greater and a temperature to sinter together the grains of superhard material to form a body of polycrystalline superhard material bonded to a substrate formed of the grains or particles of hard material along an interface to form a polycrystalline superhard construction, the superhard grains exhibiting inter-granular bonding and defining a plurality of interstitial regions therebetween; and forming a plurality of apertures or channels, one or more of said apertures or channels extending through the polycrystalline superhard construction into the substrate.

Viewed from a further aspect there is provided a tool comprising the superhard polycrystalline construction defined above, the tool being for cutting, milling, grinding, drilling, earth boring, rock drilling or other abrasive applications.

The tool may comprise, for example, a drill bit for earth boring or rock drilling, a rotary fixed-cutter bit for use in the oil and gas drilling industry, or a rolling cone drill bit, a hole opening tool, an expandable tool, a reamer or other earth boring tools.

Viewed from another aspect there is provided a drill bit or a cutter or a component therefor comprising the superhard polycrystalline construction defined above.

BRIEF DESCRIPTION OF THE DRAWINGS

The present invention will now be described by way of example and with reference to the accompanying drawings in which:

FIG. 7b is a plot of stress against time across and through the cutter element shown in FIG. 7a.

The same references refer to the same general features in all the drawings.

DESCRIPTION

As used herein, a "superhard material" is a material having a Vickers hardness of at least about 28 GPa. Diamond and cubic boron nitride (cBN) material are examples of superhard materials.

As used herein, a "superhard construction" means a construction comprising a body of polycrystalline superhard material. In such a construction, a substrate may be attached thereto or alternatively the body of polycrystalline material may be free-standing and unbacked.

As used herein, polycrystalline diamond (PCD) is a type of polycrystalline superhard (PCS) material comprising a mass of diamond grains, a substantial portion of which are directly inter-bonded with each other and in which the content of diamond is at least about 80 volume percent of the material. In one example of PCD material, interstices between the diamond grains may be at least partly filled with a binder material comprising a catalyst for diamond. As used herein, "interstices" or "interstitial regions" are regions between the diamond grains of PCD material. In examples of PCD material, interstices or interstitial regions may be substantially or partially filled with a material other than diamond, or they may be substantially empty. PCD material may comprise at least a region from which catalyst material has been removed from the interstices, leaving interstitial voids between the diamond grains.

A "catalyst material" for a superhard material is capable of promoting the growth or sintering of the superhard material.

The term "substrate" as used herein means any substrate over which the superhard material layer is formed. For example, a "substrate" as used herein may be a transition layer formed over another substrate.

As used herein, the term "integrally formed" regions or parts are produced contiguous with each other and are not separated by a different kind of material.

Figure 1:
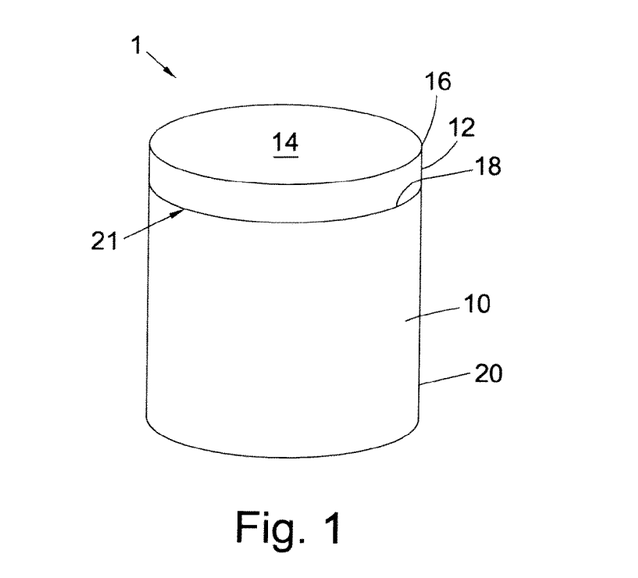
FIG. 1 is a perspective view of an example PCD cutter element or construction for a drill bit for boring into the earth.

In an example as shown in FIG. 1, a cutting element 1 includes a substrate 10 with a layer of superhard material 12 formed on the substrate 10. The substrate 10 may be formed of a hard material such as cemented tungsten carbide. The superhard material 12 may be, for example, polycrystalline diamond (PCD), or a thermally stable product such as thermally stable PCD (TSP). The cutting element 1 may be mounted into a bit body such as a drag bit body (not shown) and may be suitable, for example, for use as a cutter insert for a drill bit for boring into the earth.

The exposed top surface of the superhard material opposite the substrate forms the cutting face 14, also known as the working surface, which is the surface which, along with its edge 16, performs the cutting in use.

At one end of the substrate 10 is an interface surface 18 that forms an interface with the superhard material layer 12 which is attached thereto at this interface surface. As shown in the example of FIG. 1, the substrate 10 is generally cylindrical and has a peripheral surface 20 and a peripheral top edge 21.

The super hard material may be, for example, polycrystalline diamond (PCD) and the super hard particles or grains may be of natural or synthetic origin.

The substrate 10 may be formed of a hard material such as a cemented carbide material and may be, for example, cemented tungsten carbide, cemented tantalum carbide, cemented titanium carbide, cemented molybdenum carbide or mixtures thereof. The binder metal for such carbides suitable for forming the substrate 10 may be, for example, nickel, cobalt, iron or an alloy containing one or more of these metals. Typically, this binder will be present in an amount of 10 to 20 mass %, but this may be as low as 6 mass % or less. Some of the binder metal may infiltrate the body of polycrystalline super hard material 12 during formation of the compact 1.

Figure 2:
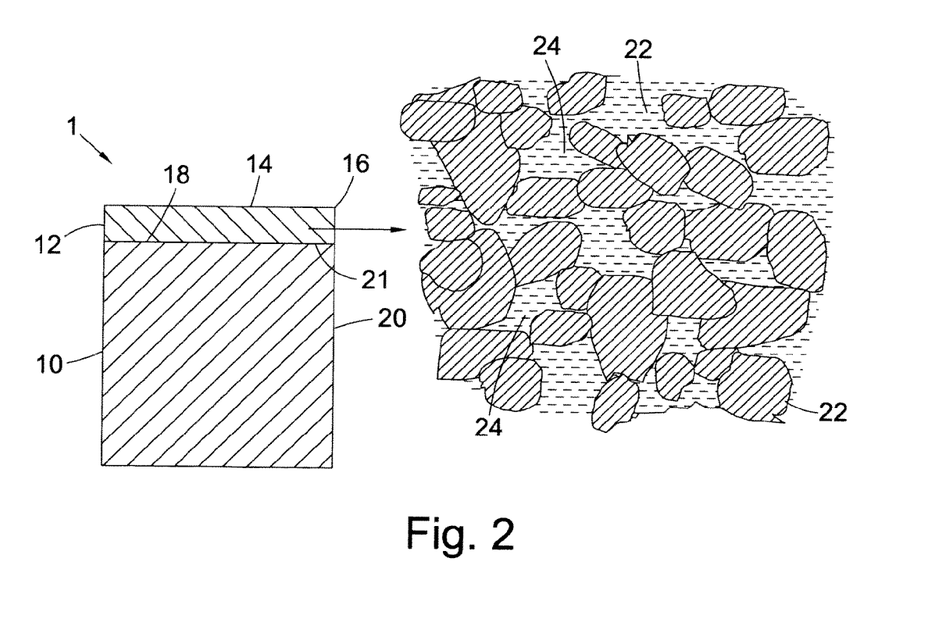
FIG. 2 is a schematic cross-section of an example portion of a PCD microstructure with interstices between the inter-bonded diamond grains filled with a non-diamond phase material.
Figure 3:
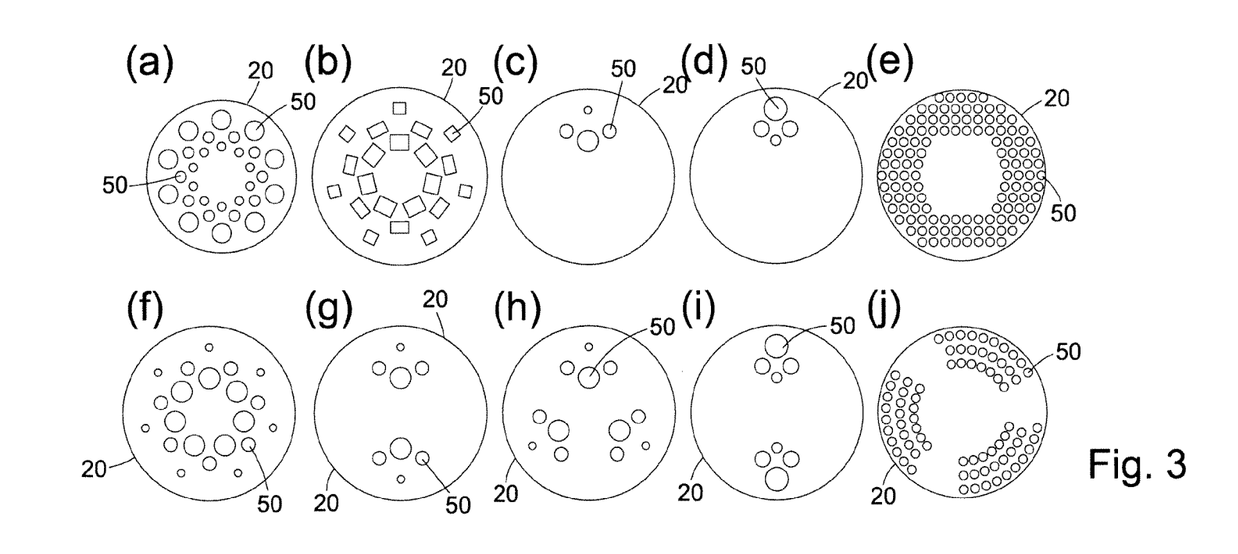
FIGS. 3a to 3j are plan views of example PCD cutter elements or constructions.

As shown in FIG. 2, during formation of the polycrystalline composite construction 1, the interstices 24 between the grains 22 of super hard material such as diamond grains in the case of PCD, may be at least partly filled with a non-super hard phase material. This non-super hard phase material, also known as a filler material may comprise residual catalyst/binder material, for example cobalt, nickel or iron and may also, or in place of, include one or more other non-super hard phase additions such as, for example, Titanium, Tungsten, Niobium, Tantalum, Zirconium, Molybdenum, Chromium, or Vanadium. In some examples, the content of one or more of these additional elements within the filler material may be, for example, about 1 weight % of the filler material in the case of Ti, about 2 weight % of the filler material in the case of V, and, in the case of W, the content of W within the filler material may be, for example, about 20 weight % of the filler material.

PCT application publication number WO2008/096314 discloses a method of coating diamond particles, to enable the formation of polycrystalline super hard abrasive elements or composites, including polycrystalline super hard abrasive elements comprising diamond in a matrix of material(s) comprising one or more of VN, VC, HfC, NbC, TaC, $Mo_2C$, WC. PCT application publication number WO2011/141898 also discloses PCD and methods of forming PCD containing additions such as vanadium carbide to improve, inter alia, wear resistance.

Whilst wishing not to be bound by any particular theory, the combination of metal additives within the filler material may be considered to have the effect of better dispersing the energy of cracks arising and propagating within the PCD material in use, resulting in altered wear behaviour of the PCD material and enhanced resistance to impact and fracture, and consequently extended working life in some applications.

In accordance with some examples, a sintered body of PCD material is created having diamond to diamond bonding and having a second phase comprising catalyst/solvent and WC (tungsten carbide) dispersed through its microstructure together with or instead of a further non-diamond phase carbide such as VC. The body of PCD material may be formed according to standard methods, for example as described in PCT application publication number WO2011/141898, using HpHT conditions to produce a sintered PCD table.

The polycrystalline composite construction 1 when used as a cutting element may be mounted in use in a bit body, such as a drag bit body (not shown).

The substrate 10 may be, for example, generally cylindrical having a peripheral surface, a peripheral top edge and a distal free end.

The working surface or "rake face" 14 of the polycrystalline composite construction 1 is the surface or surfaces over which the chips of material being cut flow when the cutter is used to cut material from a body, the rake face 14 directing the flow of newly formed chips. This face 14 is commonly also referred to as the top face or working surface of the cutting element as the working surface 14 is the surface which, along with its edge 16, is intended to perform the cutting of a body in use. It is understood that the term "cutting edge", as used herein, refers to the actual cutting edge, defined functionally as above, at any particular stage or at more than one stage of the cutter wear progression up to failure of the cutter, including but not limited to the cutter in a substantially unworn or unused state.

As used herein, "chips" are the pieces of a body removed from the work surface of the body being cut by the polycrystalline composite construction 1 in use.

As used herein, a "wear scar" is a surface of a cutter formed in use by the removal of a volume of cutter material due to wear of the cutter. A flank face may comprise a wear scar. As a cutter wears in use, material may progressively be removed from proximate the cutting edge, thereby continually redefining the position and shape of the cutting edge, rake face and flank as the wear scar forms.

As used herein, a PCD grade is a PCD material characterised in terms of the volume content and size of diamond grains, the volume content of interstitial regions between the diamond grains and composition of material that may be present within the interstitial regions. A grade of PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material and said diamond grains may be natural or synthesised diamond grains.

Different PCD grades may have different microstructures and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

All of the PCD grades may comprise interstitial regions filled with material comprising cobalt metal, which is an example of catalyst material for diamond.

The PCD structure 12 may comprise one or more PCD grades.

The grains of superhard material may be, for example, diamond grains or particles. In the starting mixture prior to sintering they may be, for example, bimodal, that is, the feed comprises a mixture of a coarse fraction of diamond grains and a fine fraction of diamond grains. In some examples, the coarse fraction may have, for example, an average particle/grain size ranging from about 10 to 60 microns. By "average particle or grain size" it is meant that the individual particles/grains have a range of sizes with the mean particle/grain size representing the "average". The average particle/grain size of the fine fraction is less than the size of the coarse fraction. For example, the fine fraction may have an average grain size of between around $\frac{1}{10}$ to $\frac{6}{10}$ of the size of the coarse fraction, and may, in some examples, range for example between about 0.1 to 20 microns.

In some examples, the weight ratio of the coarse diamond fraction to the fine diamond fraction may range from about 50% to about 97% coarse diamond and the weight ratio of the fine diamond fraction may be from about 3% to about 50%. In other examples, the weight ratio of the coarse fraction to the fine fraction may range from about 70:30 to about 90:10.

In further examples, the weight ratio of the coarse fraction to the fine fraction may range for example from about 60:40 to about 80:20.

In some examples, the particle size distributions of the coarse and fine fractions do not overlap and in some examples the different size components of the compact are separated by an order of magnitude between the separate size fractions making up the multimodal distribution.

Some examples consist of a wide bi-modal size distribution between the coarse and fine fractions of superhard material, but some examples may include three or even four or more size modes which may, for example, be separated in size by an order of magnitude, for example, a blend of particle sizes whose average particle size is 20 microns, 2 microns, 200 nm and 20 nm.

Sizing of diamond particles/grains into fine fraction, coarse fraction, or other sizes in between, may be through known processes such as jet-milling of larger diamond grains and the like.

In some examples, the binder catalyst/solvent may comprise cobalt or some other iron group elements, such as iron or nickel, or an alloy thereof. Carbides, nitrides, borides, and oxides of the metals of Groups IV-VI in the periodic table are other examples of non-diamond material that might be added to the sinter mix. In some examples, the binder/catalyst/sintering aid may be Co.

The cemented metal carbide substrate may be conventional in composition and, thus, may be include any of the Group IVB, VB, or VIB metals, which are pressed and sintered in the presence of a binder of cobalt, nickel or iron, or alloys thereof. In some examples, the metal carbide is tungsten carbide.

Figure 4:
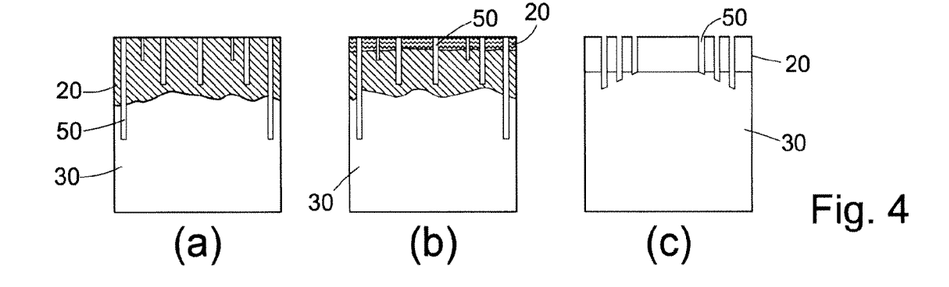
FIGS. 4a to 4c are schematic cross-sectional views through example cutter elements or constructions.

As shown in FIGS. 3a to 3j, the polycrystalline superhard construction according to some examples comprises a pattern of apertures or channels 50 one or more of which, as shown in FIGS. 4a to 4c, extend from the working surface 14 of the polycrystalline superhard body 12 into the substrate 10.

The apertures or channels 50 may comprise, in some examples, as shown in FIGS. 3a to 5, an ordered array of apertures or channels 50 or, in other examples, the channels or apertures 50 may be randomly arranged or spaced.

Whilst one or more of the apertures or channels 50 extend(s) into the substrate 10, and some may extend throughout the entire depth of the substrate 10, one or more additional apertures or channels may extend through only a portion of the polycrystalline body 12.

The shape of one or more of the apertures or channels 50 at the working surface 14 may be circular and/or non-circular and the equivalent diameter of the apertures or channels 50 may be substantially equal for two or more of the channels or substantially different and may be the same throughout the depth of the aperture or channel or increasing or decreasing throughout its depth. In some examples, the minimum depth of one or more of the apertures or channels 50 is around 20 microns or more.

In some examples, the smallest dimension of one or more of the apertures or channels 50, for example the diameter for apertures or channels having a circular cross-section, is greater than or equal to around 2 microns. In the event that the aperture or channel has a non-circular cross-section, the smaller dimension is the side of a polygon or equivalent diameter.

In some examples, the ratio of the depth of the aperture or channel 50 to the equivalent diameter of the aperture or channel is not less than around 4.

The apertures or channels 50 may extend in a plane substantially perpendicular to the plane of the working surface 14 or inclined with respect thereto.

As shown in FIG. 3a, the apertures or channels 50 may have differing diameters with, for example, the apertures or channels having the larger diameter being arranged in an annular array closest to the outer periphery of the construction and one or more concentrically arranged annular arrays of additional apertures may be located with decreasing diameters therewithin.

As shown in FIG. 3b, the apertures or channels 50 may have a non-circular cross-section and the number of apertures or channels in each concentrically arranged array may differ with, for example, fewer apertures being located in the outermost array (as shown for non-circular cross-sections in FIG. 3b and for circular cross-sections in FIG. 3f).

As shown in FIGS. 3c and 3d, a single aperture or channel 50 may be made in the working surface 14 located closest to the periphery of the construction which is closest to the first contact point between the construction and the rock in use. This aperture or channel may have a smaller or larger diameter than other holes located in its vicinity (see FIGS. 3c and 3d respectively).

In another example, two apertures or channels 50 are strategically located not less than around 5 mm apart in the working surface 14.

As shown in FIGS. 3c and 3d, there may be a plurality of additional apertures or channels 50 located around the said location of the single aperture or channel and these additional apertures or channels may have differing or the same diameter as one another and may be, for example, of a smaller diameter than the single aperture or channel.

Figure 5:
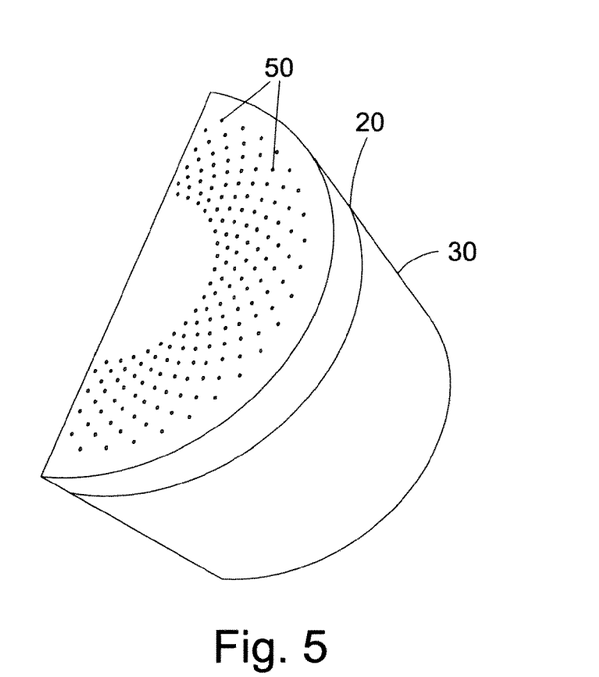
FIG. 5 is a sectional perspective view from above of an example PCD cutter element or construction.

As shown in FIGS. 3e and 5, the apertures or channels 50 may be arranged in a substantially symmetrical distribution with respect to an axis, radius, side/edge or reference point of the construction.

In other examples, the apertures or channels 50 may be randomly distributed/arranged in the construction.

In some examples, the apertures or channels 50 may be located in designated regions or segments of the working surface 14 as shown in FIGS. 3g to 3j, to enable the construction to be re-used in use by turning the construction to present a new segment to, for example, the rock being cut. Thus the apertures or channels 50 may be made in a portion of the construction to contain the damage in one sector of the construction to allow it to be reused. In one example such a region is delimited by two concentric regions one being the outer surface of the cutting element and the other circumference being smaller, for example, and no more than around 4 mm in radius.

In some examples, the apertures or channels 50 may be substantially parallel or non-parallel along their depth.

In some examples, one large aperture or channel of up to around 10 mm in diameter may extend from the working surface 14 of the construction to a depth of not less than around 3 mm through the construction.

In some examples, the diameter of one or more of the apertures or channels 50 is nano-sized, for example, less than 2 microns. In such examples, the depth of the nano-sized apertures or channels is at least around 20 microns. Furthermore, in some examples, the ratio of the depth to the equivalent diameter of the nano-sized holes is not less than around 10.

The apertures or channels 50 may be made in a leached or non-leached layer of superhard polycrystalline material. Furthermore, a number of apertures or channels 50 may be filled with a secondary material, which is non leachable such as a ceramic, metal, alloy, refractories, or combination thereof. When the apertures or channels are open they act as reflectors of energy and when there are filled with a secondary material they act as energy absorbers. Whilst not wishing to be bound by theory it is believed that the open apertures or channels may act as crack barriers, blunting the crack tip and slowing down the crack growth or propagation by increasing the required energy for its propagation. The filled apertures or channels are believed to act as energy absorbers by allowing the crack to progress at a slower rate thus reducing the risk of catastrophic failure.

The cutter of FIGS. 1, 3a to 5 having the microstructure of FIG. 2 may be fabricated, for example, as follows.

As used herein, a "green body" is a body comprising grains to be sintered and a means of holding the grains together, such as a binder, for example an organic binder.

The green body may also comprise catalyst material for promoting the sintering of the superhard grains. The green body may be made by combining the grains or particles with the binder/catalyst and forming them into a body having substantially the same general shape as that of the intended sintered body, and drying the binder. At least some of the binder material may be removed by, for example, burning it off. The green body may be formed by a method including a compaction process, an injection process or other methods such as molding, extrusion, deposition modelling methods.

A green body for the superhard construction may be placed onto a substrate, such as a pre-formed cemented carbide substrate to form a pre-sinter assembly, which may be encapsulated in a capsule for an ultra-high pressure furnace, as is known in the art. The substrate may provide a source of catalyst material for promoting the sintering of the superhard grains. In some examples, the superhard grains may be diamond grains and the substrate may be cobalt-cemented tungsten carbide, the cobalt in the substrate being a source of catalyst for sintering the diamond grains. The pre-sinter assembly may comprise an additional source of catalyst material.

In one version, the method may include loading the capsule comprising a pre-sinter assembly into a press and subjecting the green body to an ultra-high pressure and a temperature at which the superhard material is thermodynamically stable to sinter the superhard grains. In some examples, the green body may comprise diamond grains and the pressure to which the assembly is subjected is at least about 5 GPa and the temperature is at least about 1,300 degrees centigrade.

A version of the method may include making a diamond composite structure by means of a method disclosed, for example, in PCT application publication number WO2009/128034. A powder blend comprising diamond particles, and a metal binder material, such as cobalt may be prepared by combining these particles and blending them together. An effective powder preparation technology may be used to blend the powders, such as wet or dry multi-directional mixing, planetary ball milling and high shear mixing with a homogenizer. In one example, the mean size of the diamond particles may be at least about 50 microns and they may be combined with other particles by mixing the powders or, in some cases, stirring the powders together by hand. In one version of the method, precursor materials suitable for subsequent conversion into binder material may be included in the powder blend, and in one version of the method, metal binder material may be introduced in a form suitable for infiltration into a green body. The powder blend may be deposited in a die or mold and compacted to form a green body, for example by uni-axial compaction or other compaction method, such as cold isostatic pressing (CIP). The green body may be subjected to a sintering process known in the art to form a sintered article. In one version, the method may include loading the capsule comprising a pre-sinter assembly into a press and subjecting the green body to an ultra-high pressure and a temperature at which the superhard material is thermodynamically stable to sinter the superhard grains.

After sintering, the polycrystalline super hard constructions may be ground to size and may include, if desired, a 45° chamfer of approximately 0.4 mm height on the body of polycrystalline super hard material so produced.

The sintered article may be subjected to a subsequent treatment at a pressure and temperature at which diamond is thermally stable to convert some or all of the non-diamond carbon back into diamond and produce a diamond composite structure. An ultra-high pressure furnace well known in the art of diamond synthesis may be used and the pressure may be at least about 5.5 GPa and the temperature may be at least about 1,250 degrees centigrade for the second sintering process.

A further example of a superhard construction may be made by a method including providing a PCD structure and a precursor structure for a diamond composite structure, forming each structure into the respective complementary shapes, assembling the PCD structure and the diamond composite structure onto a cemented carbide substrate to form an unjoined assembly, and subjecting the unjoined assembly to a pressure of at least about 5.5 GPa and a temperature of at least about 1,250 degrees centigrade to form a PCD construction. The precursor structure may comprise carbide particles and diamond or non-diamond carbon material, such as graphite, and a binder material comprising a metal, such as cobalt. The precursor structure may be a green body formed by compacting a powder blend comprising particles of diamond or non-diamond carbon and particles of carbide material and compacting the powder blend.

In some examples, both the bodies of, for example, diamond and carbide material plus the sintering aid/binder/catalyst are applied as powders and sintered simultaneously in a single UHP/HT process. The mixture of diamond grains, and mass of carbide are placed in an HP/HT reaction cell assembly and subjected to HP/HT processing. The HP/HT processing conditions selected are sufficient to effect inter-crystalline bonding between adjacent grains of abrasive particles and, optionally, the joining of sintered particles to the cemented metal carbide support. In one example, the processing conditions generally involve the imposition for about 3 to 120 minutes of a temperature of at least about 1200 degrees C. and an ultra-high pressure of greater than about 5 GPa.

In another example, the substrate may be pre-sintered in a separate process before being bonded together in the HP/HT press during sintering of the ultrahard polycrystalline material.

In a further example, both the substrate and a body of polycrystalline superhard material are pre-formed. For example, the bimodal feed of ultrahard grains/particles and optional carbonate binder-catalyst also in powdered form are mixed together, and the mixture is packed into an appropriately shaped canister and is then subjected to extremely high pressure and temperature in a press. Typically, the pressure is at least 5 GPa and the temperature is at least around 1200 degrees C. The preformed body of polycrystalline superhard material is then placed in the appropriate position on the upper surface of the preform carbide substrate (incorporating a binder catalyst), and the assembly is located in a suitably shaped canister. The assembly is then subjected to high temperature and pressure in a press, the order of temperature and pressure being again, at least around 1200 degrees C. and 5 GPa respectively. During this process the solvent/catalyst migrates from the substrate into the body of superhard material and acts as a binder-catalyst to effect intergrowth in the layer and also serves to bond the layer of polycrystalline superhard material to the substrate. The sintering process also serves to bond the body of superhard polycrystalline material to the substrate.

In examples where the cemented carbide substrate does not contain sufficient solvent/catalyst for diamond, and where the PCD structure is integrally formed onto the substrate during sintering at an ultra-high pressure, solvent/catalyst material may be included or introduced into the aggregated mass of diamond grains from a source of the material other than the cemented carbide substrate. The solvent/catalyst material may comprise cobalt that infiltrates from the substrate in to the aggregated mass of diamond grains just prior to and during the sintering step at an ultra-high pressure. However, in examples where the content of cobalt or other solvent/catalyst material in the substrate is low, particularly when it is less than about 11 weight percent of the cemented carbide material, then an alternative source may need to be provided in order to ensure good sintering of the aggregated mass to form PCD.

Solvent/catalyst for diamond may be introduced into the aggregated mass of diamond grains by various methods, including blending solvent/catalyst material in powder form with the diamond grains, depositing solvent/catalyst material onto surfaces of the diamond grains, or infiltrating solvent/catalyst material into the aggregated mass from a source of the material other than the substrate, either prior to the sintering step or as part of the sintering step. Methods of depositing solvent/catalyst for diamond, such as cobalt, onto surfaces of diamond grains are well known in the art, and include chemical vapour deposition (CVD), physical vapour deposition (PVD), sputter coating, electrochemical methods, electroless coating methods and atomic layer deposition (ALD). It will be appreciated that the advantages and disadvantages of each depend on the nature of the sintering aid material and coating structure to be deposited, and on characteristics of the grain.

In one example, the binder/catalyst such as cobalt may be deposited onto surfaces of the diamond grains by first depositing a pre-cursor material and then converting the precursor material to a material that comprises elemental metallic cobalt. For example, in the first step cobalt carbonate may be deposited on the diamond grain surfaces using the following reaction:

The deposition of the carbonate or other precursor for cobalt or other solvent/catalyst for diamond may be achieved by means of a method described in PCT patent publication number WO2006/032982. The cobalt carbonate may then be converted into cobalt and water, for example, by means of pyrolysis reactions such as the following:

In another example, cobalt powder or precursor to cobalt, such as cobalt carbonate, may be blended with the diamond grains. Where a precursor to a solvent/catalyst such as cobalt is used, it may be necessary to heat treat the material in order to effect a reaction to produce the solvent/catalyst material in elemental form before sintering the aggregated mass.

In some examples, the cemented carbide substrate may be formed of tungsten carbide particles bonded together by the binder material, the binder material comprising an alloy of Co, Ni and Cr. The tungsten carbide particles may form at least 70 weight percent and at most 95 weight percent of the substrate. The binder material may comprise between about 10 to 50 wt. % Ni, between about 0.1 to 10 wt. % Cr, and the remainder weight percent comprises Co.

In some examples, the apertures or channels are formed after sintering, for example, by laser ablation, electron beam drilling, Electron Discharge Machining or dye sinking techniques.

In other examples, the apertures or channels 50 are made in situ during sintering of the construction. For example, using injection moulding or 3D printing of a pattern of non sinterable ceramic powder such as alumina, zirconia, yttria, hafnia, or injection moulding or 3D printing of sinterable ceramic such as tungsten carbide, boron nitride, boron carbide, silicon carbide, silicon nitride, titanium carbonitride, zirconium boride, or injection moulding or 3D printing of a pattern of chemical resistant ceramic, alloys, metal or ceramic-metal composite powders, for example.

Alternatively, a polycrystalline PCP green body could be freeze dried or a green body (precursor) of non leachable ceramic, alloys, metal or ceramic-metal composite powders could be freeze dried and used as a template during sintering to predetermine the arrangement (positions and shape or sizes) of the apertures or channels in the construction during sintering.

In one example, a male part body is prepared by a method such as 3D printing or injection moulding to form a shape having the required pattern of apertures or channels. This male part may comprise unsinterable material such zirconia, alumina, molybdenum oxide, tantalum oxide powders binded with an organic binder. Alternatively, the male part may be formed of a metallic structure prepared by injection moulding or 3D printing. A male part formed of a metallic structure may allow faster leaching rates of the sintered PCD layer by dissolution in the leaching solution leaving an engineered pattern of holes in the PCD layer. The male part is placed in a niobium cup. A diamond mix powder is introduced into the niobium cup and settled by vibration compaction to fill the spaces between the fine wires/fibers of the male body. Diamond powder particles may also be introduced as a slurry in suspension in an organic liquid. A pre-formed tungsten carbide substrate containing an appropriate catalyst (such as Co, Ni, and/or Fe) is placed on top of the green body inside the niobium cup to form a pre-composite. The pre-composite is taken through a debindering process at about 550 degrees C., and an outgassing process at 1050 degrees C. The pre-composite is then sintered under HPHT at about 1400 degrees C., and a pressure of around 5.5 GPa.

Figure 6:
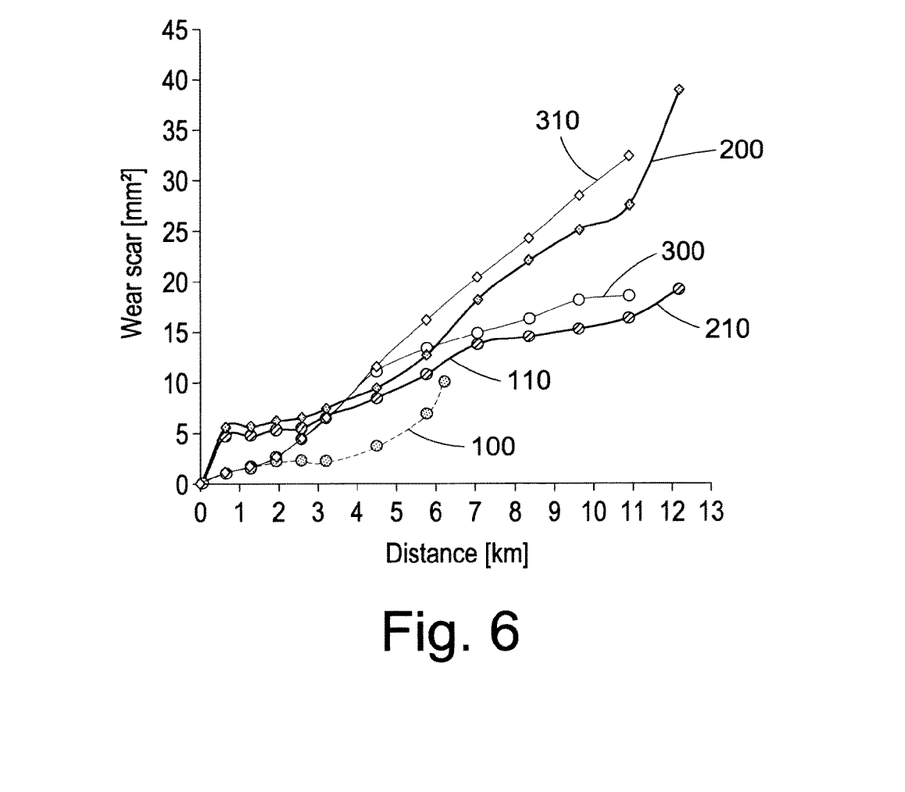
FIG. 6 is a plot showing the results of a vertical borer test comparing conventional PCD cutter elements and example cutter elements or constructions.
Figure 7A:
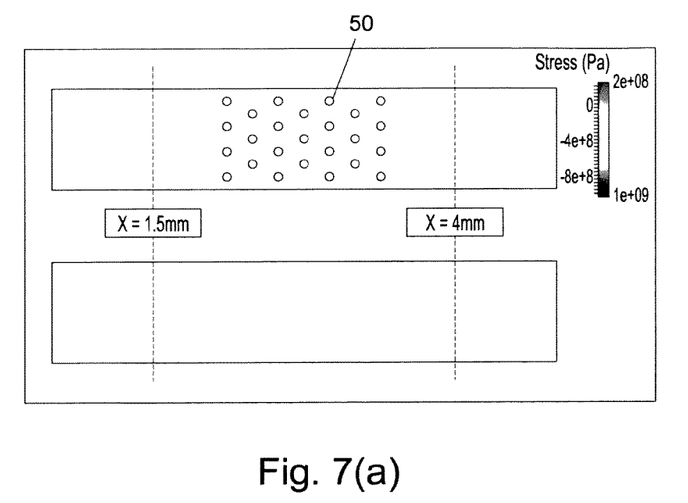
FIG. 7a is a part-section of a plan view of an example PCD cutter element.
Figure 7B:
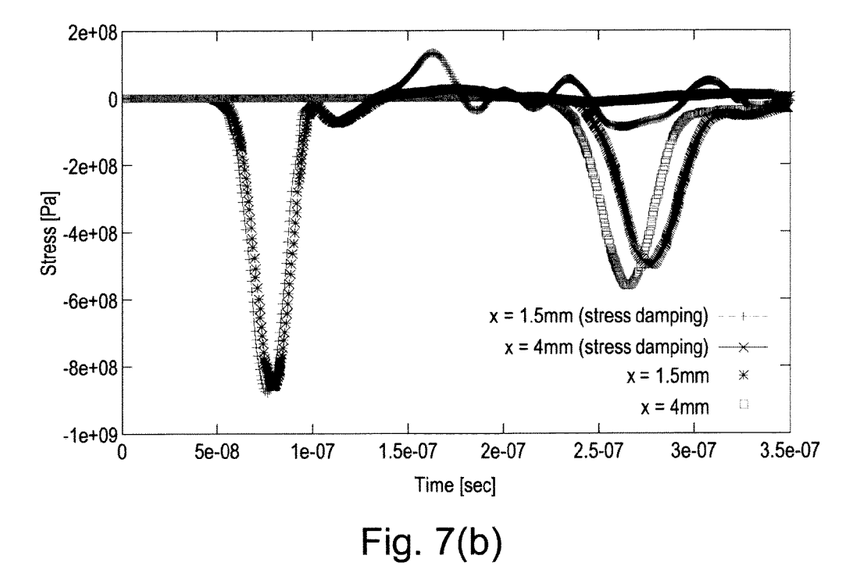

Various samples of PCD material were prepared and analysed by subjecting the samples to a number of tests. The results of these tests are shown in FIGS. 6 and 7.

A number of PCD compacts formed according to the above examples were compared in a vertical boring mill test with a commercially available polycrystalline diamond cutter elements having the same average diamond grain size as that of the two examples tested. The first example tested had smaller diameters of apertures or channels located therein (results shown by lines 200 and 210 in FIG. 6) than the second example tested which had a larger diameter of apertures or channels therein (results shown as line 300 and 310 in FIG. 6). In this test, the wear flat area was measured as a function of the number of passes of the construction boring into the workpiece. The results obtained are illustrated graphically in FIG. 6. The results provide an indication of the total wear scar area plotted against cutting length.

It will be seen that the PCD compacts formed according to examples (lines 200, 210, 300 and 310) were able to achieve a significantly greater cutting length than that occurring in the conventional PCD compact (shown by lines 100, 110 in FIG. 6) which was subjected to the same test for comparison.

Whilst not wishing to be bound by a particular theory, it is believed that the fracture performance of PCD may be improved through the introduction of a plurality of apertures or channels into the body of polycrystalline superhard material in a PCD matrix, one or more of which extend into the substrate bonded thereto, according to examples described herein. The apertures or channels are believed to inhibit or arrest crack propagation in the PCD material in use, resulting in a redistribution of available strain energy or energy release rate (G) amongst the various crack tips, and/or favourably divert cracks in the PCD material. The end result in application of the PCD material including such apertures or channels is that, in use, the cracks initiated on the wear scar may be arrested, thus reducing the strain energy available for each individual crack, hence slowing the growth rate, and the generation of shorter cracks. The ideal case is where the wear rate is comparable to the crack growth rate, in which case no cracks will be visible behind the wear scar thereby forming a smooth wear scar appearance with no chips or grains pulled out of the sintered PCD.

The addition of apertures or channels 50 may also have the effect of increasing the thermal stability of the superhard material such as PCD through the resultant lower cobalt content in the superhard material compared to conventional PCD.

The size, shape and distribution of these apertures or channels 50 may be tailored to the final application of the superhard material. It is believed possible to improve fracture resistance without significantly compromising the overall abrasion resistance of the material, which is desirable particularly for PCD cutting tools.

Thus, it is believed that examples may provide a means of toughening PCD material without compromising its high abrasion resistance. Furthermore, having one or more apertures or channels extend into the substrate is believed to inhibit or arrest cracks that may otherwise form underneath the apertures or channels from propagating into the aperture or channel from below and potentially causing the construction to spall.

Furthermore, it is believed that the apertures or channels may dampen or disperse the incident energy received from the interaction between the construction and the work piece being cut. The apertures or channels are believed to dampen/disperse the energy by reflection (for empty apertures or channels) or absorption (filled apertures or channels). Also, it is believed that the apertures or channels may act as a crack barrier hindering the crack propagation and preventing the catastrophic failure of the cutting element by spalling, chipping or pull out of block of grains.

It is also believed the apertures or channels may have an effect on the cooling efficiency and thermal stability of the construction and residual stress therein. It is believed the apertures or channels may improve the cooling efficiency of the construction by increasing the transfer surface between the construction and the coolant used during drilling. Furthermore, the apertures or channels may allow or assist in unconfined expansion of material in the bulk of the construction and reduce the residual stresses therein. The making of the apertures or channels in the construction may assist in releasing detrimental residual stresses pre-existing from the manufacturing process of the construction, as shown in FIGS. 7a and 7b. For example, the interface between the bulk material of the construction and the secondary material of filled holes allows stress accommodation due to thermal expansion mismatch between the different phases in the bulk of the construction. The apertures or channels may be filled, for example, with a precursor or secondary phase material with a CTE higher than the CTE of the polycrystalline superhard material to induce compressive stresses in the volume of polycrystalline superhard material.

The vertical borer test results shown in FIG. 6 of these engineered structures show a considerable increase in PCD cutting tool life compared to conventional PCD.

Observation of the wear scar development during testing showed the material's ability to generate large wear scars without exhibiting brittle-type micro-fractures (e.g. spalling or chipping), leading to a longer tool life Thus, examples of a PCD material may be formed having that a combination of high abrasion and fracture performance.

The PCD element 10 described with reference to FIG. 1 may be further processed after sintering. For example, catalyst material may be removed from a region of the PCD structure adjacent the working surface or the side surface or both the working surface and the side surface. This may be done by treating the PCD structure with acid to leach out catalyst material from between the diamond grains, or by other methods such as electrochemical methods. A thermally stable region, which may be substantially porous, extending a depth of at least about 50 microns or at least about 100 microns from a surface of the PCD structure, may thus be provided which may further enhance the thermal stability of the PCD element.

Furthermore, the PCD body in the structure of FIG. 1 comprising a PCD structure bonded to a cemented carbide support body may be created or finished by, for example, grinding, to provide a PCD element which is substantially cylindrical and having a substantially planar working surface, or a generally domed, pointed, rounded conical or frusto-conical working surface. The PCD element may be suitable for use in, for example, a rotary shear (or drag) bit for boring into the earth, for a percussion drill bit or for a pick for mining or asphalt degradation.

While various examples have been described with reference to a number of examples, those skilled in the art will understand that various changes may be made and equivalents may be substituted for elements thereof and that these examples are not intended to limit the particular examples disclosed.

The invention claimed is:

1. A super hard polycrystalline construction comprising:
   a body of polycrystalline super hard material, said body having an exposed working surface, said body comprising inter-bonded super hard grains comprising natural and/or synthetic diamond grains, the super hard polycrystalline construction forming a polycrystalline diamond (PCD) construction;
   a substrate attached to the body of polycrystalline super hard material along an interface; and
   a plurality of apertures or channels, one or more of said apertures or channels extending from the exposed working surface of the body into the substrate; wherein:
   the PCD construction further comprises a non-super hard phase comprising a binder phase located in interstitial spaces between the inter-bonded diamond grains.

2. The construction of claim 1, wherein one or more of said plurality of apertures or channels are at least partly filled with a secondary material.

3. The construction of claim 2, wherein the secondary material comprises one or more of a ceramic, a metal, an alloy or a refractory metal.

4. The construction of claim 2, wherein the secondary material has a higher coefficient of thermal expansion than the bulk of the polycrystalline super hard material forming the body.

5. The construction of claim 1, wherein a plurality of said apertures or channels have differing depths.

6. The construction of claim 1, wherein the body has a peripheral outer surface extending between the working surface and the substrate, and wherein one or more of the plurality of apertures or channels closest to the peripheral outer surface have the greatest depth of the apertures or channels extending from the working surface into the substrate.

7. The super hard polycrystalline construction according to claim 1, wherein a portion of the body of super hard material is free of a catalyst material for diamond, said portion forming a thermally stable region.

8. The super hard polycrystalline construction as claimed in claim 7, wherein the thermally stable region comprises at most 2 weight percent of catalyst material for diamond.

9. The super hard polycrystalline construction of claim 1, wherein a number of the apertures or channels extend through a portion of the body from the working surface and do not extend to the interface with the substrate.

10. The super hard polycrystalline construction of claim 1, wherein a number of the apertures or channels extend from the working surface to the interface and/or extend through part of or through the entire substrate.

11. The super hard polycrystalline construction of claim 1, wherein one or more of the apertures or channels comprises one or more of:

a circular cross-section;
a non-circular cross-section;
a curvilinear portion; and/or
a straight portion.

12. The super hard polycrystalline construction of claim 1, wherein a number of the apertures or channels have a circular cross-section, and wherein the respective diameters of two or more of the number of the apertures or channels differ.

13. The super hard polycrystalline construction of claim 1, wherein a number of the apertures or channels have a circular cross-section, and wherein the diameters of one or more of the apertures or channels closer to the peripheral edge of the body are less than the diameters of one or more of the apertures or channels closer to the longitudinal axis of the body.

14. The super hard polycrystalline construction of claim 1, wherein the depth of the one or more apertures or channels from the working surface is greater than or equal to around 20 microns.

15. The super hard polycrystalline construction of claim 1, wherein the depth(s) from the working surface of one or more of the apertures or channels closer to the peripheral edge of the body are greater than the depth(s) of one or more of the apertures or channels closer to the longitudinal axis of the body.

16. The super hard polycrystalline construction of claim 1, wherein one or more of the apertures or channels extend in a plane inclined to the plane of the longitudinal axis of the construction.

17. The super hard polycrystalline construction of claim 1, wherein one or more of said apertures or channels have a diameter of up to around 2 microns.

* * * * *